July 19, 1927.
W. R. EDDINGTON
1,636,220
SELECTIVE DUMPING DEVICE FOR BUCKET CONVEYERS
Filed Aug. 5, 1924
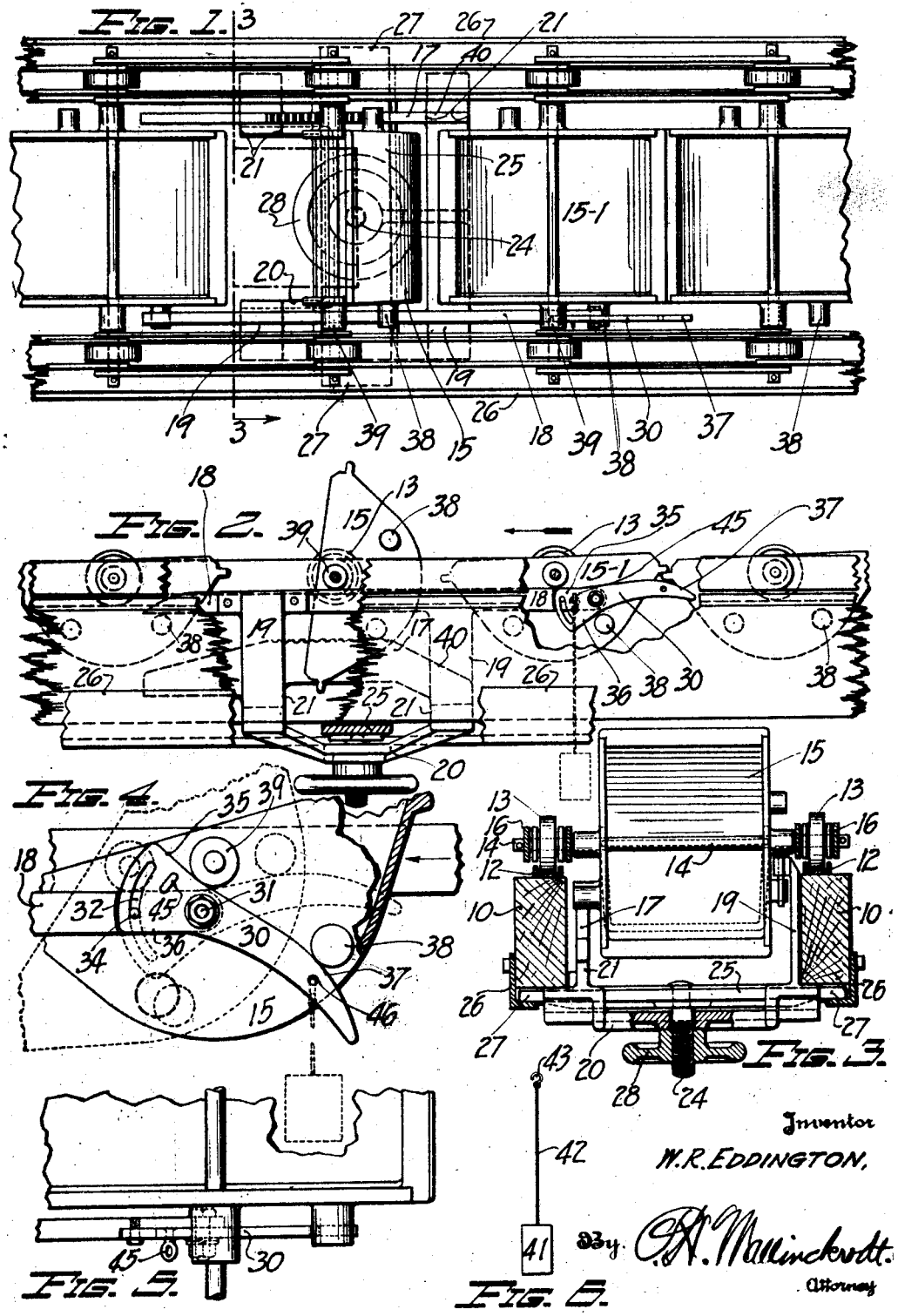
Inventor
W. R. EDDINGTON, Patented July 19, 1927.

1,636,220

UNITED STATES PATENT OFFICE.

WILLIAM R. EDDINGTON, OF MORGAN, UTAH, ASSIGNOR OF ONE-HALF TO THE MORGAN CANNING COMPANY, OF MORGAN, UTAH, A CORPORATION OF UTAH.

SELECTIVE DUMPING DEVICE FOR BUCKET CONVEYERS.

Application filed August 5, 1924. Serial No. 730,279.

This invention relates to a selective dumping device for conveyers, particularly for the swinging bucket conveyer forming the subject of U. S. Patent 1,342,789, granted to James A. Anderson, June 8, 1920. In the said patent is shown a selective dumping device for the buckets, but the present one is more flexible, more convenient, and less expensive than the other.

The principal objects of the present invention are to provide:

First. Means for automatically influencing the actions of the buckets of a conveyer in several selective ways, for instance:

(a) To dump every bucket passing a certain point.

(b) To dump every alternate bucket passing a certain point.

(c) To allow all the buckets to pass a certain point without dumping any of them.

Second. To render the device adjustable, so that it may be placed at various points along the line of travel of the conveyer.

Third. A device which shall be simple, not liable to get out of order, and be easily attended to by persons of ordinary intelligence and skill.

Fourth. Be economical in cost of manufacture and installation, and be easily applicable to existing conveyers.

In attaining the objects outlined above, an oscillating cam is provided for engaging the projecting studs of the buckets referred to in the Anderson patent above mentioned.

In the specification of this patent, the conveyer buckets are described as having studs projecting from the sides of the buckets, which engage a so-called righting mechanism, the purpose of which is to change the lapping position of two buckets adjacent each other, that is to say, one bucket has a front lip overlapping the rear lip of the next bucket, or vice versa, and the purpose of the righting mechanism is to cause a reversal of this lapping position.

In the present invention, these bucket studs are made use of in the dumping operations.

The oscillating cam of the present device, has a rear portion and a front portion, and is arranged for limiting the extent of its oscillations. The cam, relatively to the approaching buckets, is so placed, that in one position of the cam, a portion thereof shall engage a stud of every bucket in a way that, as the bucket continues in its straight line travel, the cam shall cause the lifting or tilting thereof, to an extent sufficient for the bucket to engage the spilling cam of the Anderson mechanism.

In the next selective position of the cam, the oncoming bucket may engage the cam in the same way as described just preceding, but instead of allowing the cam to be returned to the engaging position, this last mentioned bucket in passing over the cam, is arranged to leave the latter in such a position that the next oncoming, or second bucket, shall not be engaged to dump, but, on the contrary, the stud shall engage the cam at an entirely different point, and, by such engagement, the travel of the bucket shall return the cam to its first position, thereby placing it in readiness to again engage the next, or third oncoming bucket. This third bucket is engaged by the cam exactly in the same manner as was the first bucket, and in passing over the cam, this third bucket again leaves the cam in a non-tilting position, thus allowing the next, or fourth bucket, to pass unaffected, and only contacting the cam to again place it in the tilting position. The cycle described may be repeated indefinitely.

In the third selective position, the cam is so positioned, that no bucket at all is engaged for tilting by the cam, but the cam simply allows the bucket to pass over it.

The cam is usually pivoted at the end of a comparatively short bar portion, mounted on a carriage, which also supports the previously mentioned spilling cam. This carriage may be adjustably positioned at any desired point along the dumping plane of the conveyer, and may be rigidly clamped thereto by any suitable means.

The features of this invention, for which the protection of Letters Patent is desired, are collectively grouped in the claims concluding this specification.

In the drawing,

Fig. 1 represents a plan of a portion of a bucket conveyer with this invention applied thereto.

Fig. 2, a side elevation thereof, parts being broken away showing still other parts in section.

Fig. 3, a transverse vertical section on line 3—3, Fig. 1.

Figs. 4 and 5, a fragmentary elevation, partly in section, and a fragmentary plan, respectively, drawn to an enlarged scale, and showing details more clearly.

Fig. 6, a minor detail.

Referring to the drawing, 10 represents beams extending longitudinally along the sides of the line of travel of the conveyer. These beams may be of wood or other suitable material, and may support the channel rails 12, the latter constituting guides for the rollers 13 of the usual conveyer chains 16. The rollers are mounted on the axles 14, which support the swinging buckets 15, $15^1$, and so on. The spilling cam 17, having the ramp 40, is arranged in accordance with the Anderson patent, though its mounting in this instance, instead of being rigid with regard to the conveyer framework, is made adjustable, as will presently be explained in detail. The structure so far described, is designed to be arranged generally, in accordance with the Anderson patent, excepting that the bucket lugs and trippers mentioned therein, are omitted in this instance.

My improved selective dumping device, as applied to this structure, comprises the bar 18, mounted on the standards 19, the latter forming integral parts of the frame 20. Other standards 21 also form integral parts of the frame 20, and support the spilling cam 17.

A clamping frame 25, slidable along the guide angles 26, is provided with the centrally disposed threaded pin 24, rigidly fastened in the frame 25. Outstanding lugs 27 of the frame 25, rest on the horizontal legs of the angles 26, and may be drawn down tightly against these legs by means of the hand wheel 28, which is threaded on the pin 24. The pin 24 extends loosely through the frame 20, so that in tightening the hand wheel 28 against the frame 20, the frame 25 will bear downwardly, while the frame 20 is simultaneously forced upwardly thereby clamping the carriage which is made up of the two frames 20 and 25, in place between the lower faces of the beams 10 and the upper faces of the horizontal legs of the angles 26. The carriage thus supports the bar 18 and the spilling cam 17, in fixed relation to each other, and the carriage may be adjustably moved along the conveyer track. The bar 18, at its end which faces the direction of travel of the conveyer, carries the arm or cam 30, pivoted at 31. This cam is slotted at 32, concentrically with the pivot 31, and the slot, in conjunction with the pin 34 stationary in the bar 18, limits the angular movement of the cam. The cam 30 has the upper rear engaging portion 35, the lower rear engaging portion 36, and the forward engaging portion 37, all these engaging portions, in the various selective positions, being arranged to contact the bucket studs 38.

The cam 30 has two principal positions, one, shown by the full lines in Fig. 2, and the other by the full lines in Fig. 4, the former being the position in which the cam causes no buckets to tilt, and the latter the position where all the buckets are caused to tilt. In Fig. 4, the stud 38 of the bucket 15 has just contacted the portion 37 of the cam, and is shown slightly tilted. As the conveyer moves forward in the direction of the arrow, the bucket travels accordingly, and its boss 39, contacting the portion 35 of the cam, bears down on this part, and owing to the weight of the conveyer chains and buckets, depresses the rear part of the cam 30, thereby causing the forward part 37 to rise, carrying with it the stud 38 and tilting the bucket 15 to approximately the extent indicated by the dotted lines. In the tilted position, which is maintained by means of the bar 18, the bucket is ready to engage the ramp 40 of the spilling cam, which latter functions as specified in the Anderson patent. In passing over the cam 30, the bucket leaves the same in the position indicated by the dotted lines in Fig. 4, and if no means is exercised to change the position of the cam, it remains in that position, being balanced on the pivot 31.

The next bucket $15^1$, in approaching, has its stud 38 below the level of the front part of the cam 30, as shown in full lines in Fig. 2, where the stud 38 is almost in contact with the portion 36. As the bucket $15^1$ continues to move forward, the stud 38 engages the cam portion 36, thereby elevating the rear part of the cam 30, and leaving it in the original position, indicated by full lines in Fig. 4. The bucket $15^1$ has thus passed the cam without being affected by it but on the contrary, has itself changed the position of the cam, and continues on its course with the load therein undisturbed. The cam 30 has now been left in the position where it will engage, and cause the tilting of, the next oncoming, or third bucket, and this third bucket will act in precisely the same manner as the first bucket, again leaving the cam in the non-tilting position for the fourth bucket. Reversal in the positions of the cam takes place automatically, and consequently tilts every alternate bucket.

Now, if the cam 30 were left constantly in the position shown by the full lines in Fig. 2, no passing buckets at all, would be dumped, while if the cam were left constantly in the position shown by the full lines in Fig. 4, every passing bucket would be dumped. In order to hold the cam normally in either of these two positions when so desired, a weight 41 of suitable size, may be suspended from a cord 42, and the latter be provided with a hook 43. This hook may be placed in the eyebolt 45, or in the hole 46 of the cam 30. If the hook is placed in the first position, the weight 41, indicated by the dotted lines in Fig. 2, will normally hold the cam in the non-tilting position, while, if the hook 43 is placed in the hole 46, the weight 41, indicated by dotted lines in Fig. 4, will hold the cam normally in position for tilting all the buckets.

The weight 41 should be sufficiently large to return the cam to the desired normal position after the same has been displaced by a passing bucket stud.

The utility of this invention is not confined to bucket conveyers, but extends to any traveling conveyers having carrying units which may be selectively tilted by the actuation of the oscillating cam having the initial engaging portion 35, and the subsequent engaging portion 37, as herein disclosed.

While a specific embodiment of this invention is herein shown and described, it is to be clearly understood that the detailed parts thereof, may, or may not, be shown in the preferred forms, and further, that the preferred forms may be varied from time to time, as the development of this invention and the arts with which it is identified, progress.

Therefore, that which forms an essential and characteristic part of this invention, will be readily discernible from the claims in which its spirit is generalized.

Having fully described my invention, what I claim is:

1. In combination with a traveling conveyer having spilling means and buckets arranged to selectively engage the said spilling means, an oscillating cam having portions for selectively causing the said buckets to engage the said spilling means, and means for selectively positioning the said cam.

2. In combination with a traveling conveyer having carrying units arranged to engage a spilling device, an oscillating cam positioned along the path of said units, means for actuating said cam by a passing unit, and means whereby the said actuation of the cam shall cause said units to engage the said spilling mechanism.

3. In combination with a traveling conveyer having swinging carrying units, an oscillating cam having an initial engaging portion and a subsequent engaging portion, means for automatically positioning the said cam, and means whereby selected carrying units in passing the said cam, shall respectively engage, and be engaged by, the said initial and subsequent engaging portions.

4. In combination with a traveling conveyer having spilling means and buckets arranged to selectively engage the said spilling means, of an oscillating cam having portions for selectively causing the said buckets to engage the said spilling means, means for selectively positioning the said cam, a carriage movable along the line of travel of the said conveyer and means for operatively mounting the said spilling means and the said cam upon the said carriage.

5. A plurality of buckets arranged to travel in a line, an oscillating cam having a front portion, an upper rear portion and a lower rear portion arranged in the line of travel of the said buckets so that the said upper rear portion in one position of the said cam, shall engage one of the oncoming said buckets, the said front portion thereby be caused to tilt the said one bucket, the said cam be left in another position by the passing of the said one bucket, the said lower rear portion be thereby positioned for engagement by the next oncoming bucket and the said cam be left in the said first position by the passing of the said next bucket.

6. In combination with a traveling conveyer having buckets, an oscillating member having cam portions selectively arranged in proximity to the path of said buckets, an engaging member on each bucket positioned for engagement by the said cam portions, and means for selectively positioning the said oscillating member.

7. In a traveling conveyer having buckets arranged to swing in a plane paralleling the line of travel of the buckets, the combination of engaging members projecting from the said buckets in a direction transverse to the said plane with an oscillating cam arranged in the path of travel of the said engaging members, and portions arranged on the said cam for selectively engaging the said engaging members.

8. A traveling conveyer having axle pins arranged transversely to the line of travel thereof, buckets with hubs arranged to swing on the said axle pins, lugs projecting from the buckets transversely to the line of travel thereof, a carriage movable along the said conveyer and an oscillating cam mounted on said carriage, said cam having engaging portions arranged for selective positioning in the pathway of the said hubs and the said lugs.

9. A traveling conveyer having swinging buckets, a movable carriage with an oscillating cam mounted thereon and arranged in the path of said buckets, engaging members on each bucket positioned to be actuated by portions of the said cam for selectively tilting the buckets or not tilting them, at points in the travel thereof, and means for normally holding the cam in a selected position.

10. A traveling conveyer having swinging buckets, an oscillating cam arranged to engage the said buckets at a point in the path thereof, the oscillating cam having an upper rear portion, a lower rear portion and a front portion, said portions arranged to engage the said buckets, and means for selectively positioning the cam in such a manner that different predetermined effects may result from the engagement of said cam portions with said buckets.

11. A traveling conveyer, having swinging buckets, an oscillating cam arranged in proximity to the path of the buckets, means for limiting the extent of oscillation of the cam, and means for placing the cam normally in any one of several positions to cause any one of the effects named following: to tilt every bucket passing a certain point, to tilt every other bucket passing a certain point, to tilt none of the buckets passing a certain point.

12. A traveling conveyer having axle pins arranged transversely to the direction of travel thereof, buckets arranged to swing on the axle pins, axle hubs, projecting outwardly from the buckets, said hubs having cam actuating portions, lugs projecting outwardly from the buckets and having cam actuating portions in the same plane as the cam actuating portions of the hubs, the lugs being spaced apart from the axle hubs in the swinging plane, a longitudinal bar arranged to pass between the axle hubs and the lugs of each bucket in the normal carrying position of the buckets, a cam pivoted to the bar and adjustable to positions wherein engaging portions of the said cam will be presented to the hub, to the lug, or to the hub and the lug, means for limiting the movement of the cam, and means for automatically positioning the cam in selected positions.

In testimony whereof, I sign my name hereto.

W. R. EDDINGTON.